United States Patent
Ahmed et al.

(10) Patent No.: US 6,833,407 B1
(45) Date of Patent: Dec. 21, 2004

(54) SOLVENT FREE SILICONE COATING COMPOSITION

(75) Inventors: Farooq Ahmed, Guelph (CA); Faisal Huda, Toronto (CA); Serajul Huda, Toronto (CA); John Barr, Eden Mills (CA)

(73) Assignee: CSL Silicones Inc., Toronto ( * ) Notice: Subject to any disclaimer, the term of this patent is extended or adjusted under 35 U.S.C. 154(b) by 0 days.

(21) Appl. No.: 10/685,469

(22) Filed: Oct. 16, 2003

(51) Int. Cl.$^7$ ................................................ C08L 83/06
(52) U.S. Cl. .................. 524/588; 525/477; 528/34; 528/17; 528/38; 528/901; 524/437; 524/492

(58) Field of Search .................................. 524/588, 437, 524/492; 525/447; 528/34, 17, 38, 901; 5525/477

(56) References Cited

U.S. PATENT DOCUMENTS 5,326,804 A * 7/1994 Mistry et al. ................ 524/188

* cited by examiner

*Primary Examiner*—Kuo-Liang Peng

(57) ABSTRACT

The present invention relates to a solvent free one-part room temperature vulcanizable organopolysiloxane rubber composition which crosslinks in the presence of moisture to form a high gloss coating with minimal shrinkage for surfaces.

19 Claims, No Drawings

SOLVENT FREE SILICONE COATING COMPOSITION

FIELD OF THE INVENTION

The present invention is directed to a solvent free silicone coating composition which cures with minimal shrinkage and a high-gloss surface.

BACKGROUND OF THE INVENTION

It is common to coat various surfaces with compositions to protect the surface against environmental effects. A common coating composition is an epoxy based composition which utilizes a two-part composition which is coated on the surface by brushing, dipping or spraying. Epoxy based coating compositions have the advantage of providing a coating with a high-gloss surface. However the epoxy based coatings generally require that the two separate parts be mixed together and used within a very short period of time. If the composition is not utilized with this period of time, it will cure before it can be applied to the surface. In addition, epoxy based compositions may emit volatile organic compounds (VOC) and require care in handling.

Silicone based compositions have also been utilized for coating of surfaces to protect the surface against environmental effects. Silicone compositions offer the advantage of long life and high resistance. However due to the nature of the curing reaction for silicone compositions, the thickness of the coating may shrink causing the surface of the coating to have a matte or satin finish. It would be advantageous to provide a silicone based composition having long life and high resistance along with minimal shrinkage of the coating and a high-gloss finish.

SUMMARY OF THE INVENTION

The present invention provides a solventless, one part room temperature vulcanizable coating for coating surfaces to provide a high gloss, minimal shrinkage coating to the surface. The coating provides for easy and convenient application by conventional methods such as dipping, flow or spraying. The coating provides a guard against environmental effects along with high physical strength and adhesion achieved with a suitable blend of reinforcing and extending fillers.

In one aspect, the present invention provides for a one-part room temperature vulcanizing organopolysiloxane rubber coating composition to provide a high gloss surface coating. The composition consists essentially of the product which is obtained by mixing the following:

a) from about 20 to about 60 weight percent of one or more polydiorganosiloxane fluids of the formula $$HO[(R)_2SiO]_n(R)_2SiOH$$

in which R is a monovalent alkyl or alkenyl radical having 1 to 8 carbon atoms or a phenyl radical, and n has an average value such that the viscosity is from about 10 to about 10,000 centipoise at 25° C., b) from 0 to about 8 weight percent of a bifunctional chain extender of the general formula $$R^4{}_2-Si-X_2$$

where X is alkoxy or ketoximino and R4 is a monovalent alkyl or alkenyl radical having 1 to 8 carbon atoms or a phenyl radical;

c) from 0 to about 50 weight percent of an inorganic extending or non-reinforcing filler;

d) from about 0.5 to about 20 weight percent of an amorphous $SiO_2$ reinforcing filler having a surface area of between about 50 to 250 $m^2/g$ and a particle size range between about 0.01 and 0.03 microns;

e) from about 3 to about 15 weight percent of one or more crosslinking agents of general formula $$(X)_{4-m}-Si-R'_m$$

where R' is an alkyl, alkenyl or phenyl radical (preferably methyl or ethyl), X is an alkyl radical with a functional group selected from carboxyl, ketoximino, alkoxy, carbonyl or amine linked directly to the silicone atom, and m is an integer of from 0 to 2;

f) from about 0.2 to about 3 weight percent of an adhesion promoter of the formula $$(R^2O)_{3-b}SiR^1{}_{R^3{}_b}$$

in which $R^2$ and $R^3$ are independently selected from monovalent alkyl or alkenyl radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group; and g) from about 0.02 to about 3 weight percent of an organotin salt as a condensation catalyst.

The present invention also provides for a method of coating surfaces to provide a high gloss coating with minimal shrinkage on the surface. The method comprises applying to the surface a thin layer of the above one-part organopolysiloxane rubber composition and allowing the layer of the one-part organopolysiloxane rubber composition to cure at room temperature to a silicone elastomer.

DETAILED DESCRIPTION OF THE INVENTION

The one-part organopolysiloxane rubber compositions of the present invention are ideally suited for protection of surfaces from environmental effects. Such protection includes corrosion protection of metal or concrete surfaces and structures against salt spray and chemical environments including direct exposure to salt water, salt fog, gases and other industrial pollutants. The compositions of the present invention can also be used to coat metal surfaces of motor vehicles which may be exposed to high salt condition during the winter season. The compositions with suitable additives also provide protection against the effects of weathering from exposure to among others UV radiation. The compositions of the present invention are particularly useful on marine installations, such as fouling resistant coatings of ship hulls, oil rigs, docks, piers, buoys, water intake pipes and various submerged structures. The coating composition of the present invention is also useful for coating electric transmission towers and bridges for corrosion protection of metal or concrete structures directly exposed to salt water and industrial pollution, especially sulfur based. The composition containing alumina trihydrate can be utilized as a protective coating on electrical insulators providing both corrosion and leakage current protection. The coating composition can also be utilized for forming an impervious layer by coating textiles such as Geo Tech or nylon, cotton or other fabrics to be used as chemical containment or as tents, awnings, canopies, etc. The absence of solvent or diluent, especially volatile organic components (VOC), in the coating composition makes it ideal for use in contained areas where minimum levels of VOC is required. The absence of solvent or diluent also surprisingly results in a coating having a high gloss surface and minimal shrinkage of the thickness of the coating when curing.

Because it is made of silicone, the resulting smooth high gloss coating on the surface provides protection against the otherwise damaging effects of environmental weathering, UV exposure, hydrolysis, and other effects. Because of its naturally hydrophobic nature, the external layer of silicone creates a highly hydrophobic coating of very low cost.

The one-part organopolysiloxane rubber compositions of the present invention for use as a protective coating contain about 20 to about 60 weight percent of one or more polydiorganosiloxane fluids of the formula:

$$HO[(R)_2SiO]_n(R)_2SiOH$$

in which R is a monovalent alkyl or alkenyl radical having 1 to 8 carbon atoms or a phenyl radical, and n has an average value such that the viscosity is from about 100 to about 20,000 centipoise at 25° C. Preferably n has an average value such that the viscosity is between about 500 and about 10,000 centipoise at 25° C., more preferably between about 1,000 and about 5,000 centipoise at 25° C. Polydimethylsiloxane is the most preferable silicone polymer fluid. The polydimethylsiloxanes may contain small amounts of monomethylsiloxane units and methyl radical replaced with other radicals in small amounts as impurities such as is found in commercial products, but the preferred fluid contains only polydimethylsiloxane. When using low viscosity fluids, generally 1000 centipoise or less, it may be advantageous to add bifunctional chain extenders of the general formula $$R^4{}_2\text{—Si—}X_2$$

where X is alkoxy or ketoximino and R4 is a monovalent alkyl or alkenyl radical having 1 to 8 carbon atoms or a phenyl radical. If chain extenders are utilized they are generally present in an amount of between about 2 weight percent and about 8 weight percent.

The composition also contains 0 to 50 weight percent, preferably 10 to 50 weight percent, more preferably 15 to 40 weight percent, of inorganic extending or non-reinforcing fillers to increase the resistance of the coating to environmental effects, including high temperature stability of the cured product. The extending fillers are preferably selected from inorganic materials such as calcium carbonate, barium sulfate, iron oxide, diatomaceous earth, melamine, quartz, crystalline silica, titanium dioxide, alumina trihydrate, zinc oxide, zirconium oxide, zirconium silicate, zinc borate and chromic oxide. The selection of the filler will be based upon the required properties and the final usage of the composition. Thus, for applications where high temperature resistance is not required, such as corrosion protection coating of electrical power systems, roof coatings, etc., the preferred filler will be calcium carbonate, diatomaceous earth or quartz. For applications where high temperature stability is required, such as coating exhaust pipes and mufflers of motor vehicles, the preferred filler will be melamine, iron oxide, zinc oxide, titanium dioxide, zirconium oxide, zinc borate or chromic oxide. For coatings requiring higher strength crystalline silica is utilized while for coatings for electrical insulators., the composition will contain alumina trihydrate to provide leakage current protection. In an aspect of the invention, the composition is for coating high voltage electrical insulators and further includes about 36 to about 48 weight percent of alumina trihydrate, the alumina trihydrate having a median particle size of 13. µm, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42, the aluminum trihydrate being present in a proportion of 90 to 110 parts by weight per 100 parts by weight of the polyorganosiloxanes. The amount of filler may be increased within the range to improve the desired properties.

The composition also contains about 0.5 to 20 weight percent of an amorphous $SiO_2$ reinforcing filler having a surface area of between about 50 and about 250 m²/g and a particle size range between about 0.01 and 0.03 microns. Preferably the surface area is between about 50 and about 150 m²/g, more preferably between about 75 and about 150 m²/g. The specific gravity of the filler is preferably about 2.2. The surface of amorphous silica may also be treated with organic molecules such as hexamethyldisilazane or polydimethylsilixoane or silane. It has been found that using a surface treated silica helps reduce the viscosity of the composition. Similarly the use of lower surface area fillers also aids in reducing viscosity of the composition.

The composition also contains about 3 to about 15 weight percent, preferably about 3 to about 10 weight percent of an organofunctional cross-linking agent of general formula $$(X)_{4-m}\text{—Si—}R'_m$$

where R' is an alkyl, alkenyl or phenyl radical (preferably methyl (or ethyl), X is an alkyl radical with a functional group selected from carboxyl, ketoximino, alkoxy, carbonyl or amine linked directly to the silicone atom, and m is an integer of from 0 to 2. Preferably the cross linking agent is an oximinosilane cross linking agent of the formula $RSi(ON=CR'_2)_3$ in which R and R' each represent a monovalent alkyl or alkenyl radical having 1 to 8 carbon atoms or a phenyl radical, preferably an alkyl radical such as methyl, ethyl, propyl, butyl, or an alkenyl radical such as vinyl, allyl, or a phenyl radical. The preferred R and R' are alkyl or vinyl radicals, most preferably methyl and ethyl radicals.

The composition also contains about 0.2 to about 3 weight percent of an organo functional silane as an adhesion promoter. Preferably the organo functional silane has the formula $$(R^2O)_{3-b}SiR^1{}{\overset{R^3{}_b}{|}}$$

wherein $R^2$ and $R^3$ are independently selected from monovalent alkyl or alkenyl radicals having 1 to 8 carbon atoms or a phenyl radical, b is an integer from 0 to 3, preferably 0, and $R^1$ is a saturated, unsaturated or aromatic hydrocarbon radical being 1 to 10 carbon atoms, which may be further functionalized by a member selected from the group consisting of amino, ether, epoxy, isocyanate, cyano, acryloxy and acyloxy and combinations thereof. $R^2$ and $R^3$ are preferably an alkyl radical such as, for example, methyl, ethyl, propyl, butyl, or an alkenyl radical such as vinyl and allyl. More preferably $R^2$ and $R^3$ are alkyl radicals, most preferably methyl, ethyl or propyl radicals. Preferably $R^1$ is an alky group, more preferably further functionalized by one or more amino group. The most preferred organo-functional silane is N-(2-aminoethyl-3-aminopropyl)trimethoxysilane.

In all of the above compounds, the alkyl includes straight, branched or cyclic radicals. Among the alkyl groups are $C_{1-8}$ straight or branched chain alkyl such as, for example, methyl, ethyl, propyl, isopropyl, n-butyl, isobutyl, tert-butyl, pentyl, isopentyl, hexyl, etc., the cycloalkyl are $C_{3-8}$ cycloalkyl such as, for example, cyclopropyl, cyclobutyl, cyclohexyl, etc., the alkenyl groups are $C_{1-8}$ alkylene such as, for example, vinyl and allyl. The above groups as well as the phenyl radicals may be further functionalized by including in the chain or ring structure, as the case may be, a group selected from the class consisting of amino, ether, epoxy, isocyanate, cyano, acryloxy, acyloxy and combinations, so long as the functionalization does not adversely affect the desired properties of the compound.

The composition additionally contains about 0.02 to about 3 weight percent of an organotin salt of a carboxylic acid as a condensation catalyst, which accelerate the aging of the composition. Preferably the organotin salt is selected from the group dibutyltin diacetate, stannous octoate, dibutyltin dioctoate and dibutyltin dilaurate. Most preferably the organotin salt is dibutyltin dilaurate of the formula:

$(C_4H_9)_2Sn(OCOC_{10}H_{20}CH_3)_2$.

The composition may contain other optional ingredients such as pigments and other fillers in minor amounts provided that the addition of the ingredients does not cause degradation of the desired properties of the cured coating made from the composition. One commonly utilized optional ingredient is a pigment, preferably a gray pigment, most preferably present in amounts up to about 4 weight percent.

The organopolysiloxane composition of the present invention is prepared by mixing the ingredients together in the absence of moisture. The silane is moisture sensitive and will undergo cross-linking in the presence of moisture such that the mixture must be essentially absent of free moisture when the silane is added and maintained in a moisture free state until cure is desired.

A preferred method of mixing comprises mixing the polysiloxane fluids with the extending and reinforcing fillers and other optional fillers and pigments. Thereafter, the oximinosilane and organo-functional silane are added and mixed under a nitrogen atmosphere. The organotin salt is added to the mixture and the mixture is then dispensed in sealed containers for storage prior to use.

The surface to be protected is coated with the composition by conventional methods such as dipping, brushing or spraying. Preferably, the surface to be protected is coated by spraying one or more applications of the composition of the present invention. The composition may be adjusted to the consistency suitable for use in these methods by heating, particularly for spray application. The thickness of the coating will depend upon the specific requirements of the application and the desired level of protection. The coating generally has an average thickness of 250 to 1500 microns more preferably, an average thickness of 200 to 1000 microns, most preferably about 200 to 750 microns After the coating is formed on the surface, the surface is exposed to normal atmosphere for cross-linking and cure of the coating.

The improved coating of the present invention is capable of protecting surfaces from environmental effects including metal and concrete surfaces from corrosion in the presence of moisture such as rain or fog in combination with contaminated atmospheres, salt spray or fog or direct exposure to salt water.

The improved coating of the present invention is particularly useful for protecting metal surfaces which are directly exposed to salt water. Such surfaces include the hulls of ships and other vessels, oil drilling rigs, harbour and pier structures, etc. When the coating is used on the hulls of ships, further benefits such fouling resistant in addition to the corrosion protection are achieved. The coating does not allow marine animals, such as barnacles, to easily attach to the surface. Any such animals which attempt to attach to the surface are generally removed from the surface by high pressure washers. Additionally, clean up of the surface is generally accomplished by high pressure wash and/or hand or mechanical wiping and does not require the scraping operations commonly utilized during hull cleaning of ships, or other marine installations. As clean up of surfaces coated with the composition of the present invention is easily accomplished, the composition can also be used as an anti-graffiti coating on surfaces.

The following examples are included to illustrate preferred embodiments of the invention and to demonstrate the usefulness of the coating and are not intended to limit in any way the scope of protection for the invention.

The following examples are included to illustrate preferred embodiments of the invention and to demonstrate the usefulness of the coating and are not intended to limit in any way the scope of protection for the invention.

EXAMPLE 1

A solventless coating composition was prepared by mixing 46 parts by weight of polydimethylsiloxane fluid having viscosity of 2,000 centipoise and 5 parts by weight of amorphous silica having specific gravity of 2.2 and surface area of about 130 m2/g. Then 6 parts by weight of methyl tris-(methyl ethyl ketoxime) silane and 1 part by weight of N-(2-aminoethyl-3-aminopropyl) trimethoxy silane are added and mixed under nitrogen atmosphere. Then 39 parts by weight of quartz powder were also added and mixed. To prepare a coating with desired colour 3 parts by weight of pigment paste were also added and mixed to a uniform consistency. The pigment paste was prepared by mixing 50 parts by weight of pigment powder into polydimethylsiloxane fluid. Finally 0.1 parts by weight of dibutyltin dilaurate is added and mixed thoroughly.

The finished product has a viscosity that makes it suitable for application by roller and brush. The coating can also be applied by spray application by heating in situ to a temperature of 70° C.

The cured coating possesses high gloss and scratch resistance properties. The gloss value of 70 gloss unit @ 60° was recorded at gloss meter by Folio Instruments Inc.

EXAMPLE 2

A solventless coating composition for coating high voltage insulators was prepared by mixing 46 parts by weight of polydimethylsiloxane fluid having a viscosity of 2,000 centipoise and 4 parts by weight of surface treated amorphous silica (surface treated with hexamethyldisilazane) having specific gravity of 2.2 and surface area of about 130 m²/g. Then 6 parts by weight of methyl tris-(methyl ethyl ketoxime) silane and 1 part by weight of N-(2-aminoethyl-3-aminopropyl) trimethoxy silane are added and mixed under nitrogen atmosphere. Then 40 parts by weight of alumina trihydrate were also added and mixed. To prepare a coating with desired colour 3 parts by weight of pigment paste were also added and mixed to a uniform consistency. The pigment paste was prepared by mixing 50 parts by weight of pigment powder into polydimethylsiloxane fluid. Finally 0.1 parts by weight of dibutyltin dilaurate is added and mixed thoroughly.

The finished product has a viscosity that makes it suitable for application by roller and brush. The coating can also be applied by spray application by heating in situ to a temperature of 70° C.

The cured coating possesses high gloss and scratch resistance properties. The gloss value of 70 gloss unit @ 60° a was recorded at gloss meter by Folio Instruments Inc.

The compositions of the present invention are also useful for protecting other types of surfaces from corrosive environments. For example, the compositions of the present invention are particularly useful for protecting surfaces for spillage containment around tank farms and the like. The composition may be coated onto a heavy-duty fabric which is then utilized to line the interior of the spillage catch basins around the tank farm. Samples of heavy-duty Geo fabric were sprayed with the composition of the present invention to coat the fabric. Treated and untreated samples of fabric were exposed to 10% caustic soda aqueous solution, diesel oil, furnace oil by placing samples of these materials on the surface of the fabric for up to seven days. No deterioration of the treated fabric was observed and the deposits of the material were easily able to be cleaned up without any noticeable loss of weight of the material. In contrast, untreated fabric did not retain the material on the surface and the caustic soda solution caused deterioration of the untreated fabric material within 24 hours.

The compositions of the present invention are useful in many instances where protection of surfaces against environmental effects is desired. These compositions include the composition of the above examples as well as other compositions, the formulation of which is well within the skill of the ordinary workman in the art. The selection of the various components and their proportions would be immediately apparent depending upon the desired properties of the final coating.

While the invention has been described in reference to specific embodiments it should be understood by those skilled in the art that various changes can be made and equivalents may be substituted without departing from the true spirit and scope of the invention. All, such modifications are intended to be within the scope of the claims appended hereto.

The embodiments of the invention in which an exclusive property or privilege is claimed are as follows:

1. A one-part organopolysiloxane rubber composition for use as a high gloss coating on surfaces the composition consisting essentially of the product which is obtained by mixing the following:

a) from about 20 to about 60 weight percent of one or more polydiorganosiloxane fluids of the formula $$HO[(R)_2SiO]_a(R)_2SiOH$$

in which R is a monovalent alkyl or alkenyl radical having 1 to 8 carbon atoms or a phenyl radical, and n has an average value such that the viscosity is from about 100 to about 20,000 centipoise at 25° C.;

b) from 0 to about 8 weight percent of a bifunctional chain extender of the general formula $$R_2^4\text{—Si—}X_2$$

where X is alkoxy or ketoximino and R4 is a monovalent alkyl or alkenyl radical having 1 to 8 carbon atoms or a phenyl radical;

c) from 0 to about 50 weight percent of an inorganic extending or non-reinforcing filler;

d) from about 0.5 to about 20 weight percent of an amorphous $SiO_2$ reinforcing filler having a surface area of between about 50 to 250 $m^2/g$ and a particle size range between about 0.01 and 0.03 microns;

e) from about 3 to about 15 weight percent of one or more crosslinking agents of general formula $$(X)_{4-m}\text{—Si—}R'_m$$

where R' is an alkyl, alkenyl or phenyl radical, X is an alkyl radical with a functional group selected from carboxyl, ketoximino, alkoxy, carbonyl or amine linked directly to the silicone atom, and m is an integer of from 0 to 2;

f) from about 0.2 to about 3 weight percent of an adhesion promoter of the formula $$(R^2O)_{3-b}SiR^1\overset{R^3_b}{|}$$

in which $R^2$ and $R^3$ are independently selected from a monovalent alkyl or alkenyl radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group; and g) from about 0.02 to about 3 weight percent of an organotin salt as a condensation catalyst.

2. A composition according to claim 1 wherein n is selected such that the viscosity is from about 1,000 to about 5,000 centipoise at 25° C.

3. A composition according to claim 2 wherein R is alkyl.

4. A composition according to claim 3 wherein R is methyl.

5. A composition according to claim 4 wherein the crosslinker is an oximosilane cross-liking agent of the formula;

$$RSi(ON\!=\!CR'_2)_3$$

in which R and R' are independently selected from monovalent alkyl or alkenyl radicals having 1 to 8 carbon atoms or a phenyl radical which may optionally be substituted with an alkyl radical having 1 to 8 carbon atoms.

6. A composition according to claim 5 wherein the adhesion promoter is a compound of the formula $$\begin{array}{c}NHCH_2CH_2NH_2\\|\\CH_2\\|\\CH_2CH_2Si(OMe)_3\end{array}$$

wherein Me is the methyl radical.

7. A composition according to claim 6 wherein the organotin salt is an organotin salt of a carboxylic acid selected from the group consisting of dibutyltindiacetate, stannous octoate and dibutyltin dioctoate.

8. A composition according to claim 7 wherein the organotin salt of a carboxylic acid is a compound of the formula $$(C_4H_9)_2Sn(OCOC_{10}H_{20}CH_3)_2$$

9. A composition according to claim 8 wherein the inorganic extending or non-reinforcing filler is one or more materials selected from calcium carbonate, barium sulfate, iron oxide, diatomaceous earth, melamine, quartz, crystaline silica, titanium dioxide, alumina trihydrate, zinc oxide, zirconium oxide, zinc borate and chromic oxide.

10. A composition according to claim 9 wherein the surface of the amorphous $SiO_2$ reinforcing filer has been treated with hexamethyldisilazane or polydimethylsiloxane or silane.

11. A composition according to claim 9 wherein the inorganic extending or non-reinforcing filler is a combination of about 0.5 to about 5.0 weight percent of crystalline silica and about 36 to about 48 weight percent of alumina trihydrate, the alumina trihydrate having a median particle size of 13.$\mu$m, containing 65.1 weight percent $Al_2O_3$, 34.5 weight percent combined $H_2O$, 0.3 weight percent $Na_2O$, 0.02 percent CaO, 0.01 weight percent $SiO_2$ and having a specific gravity of 2.42, the aluminum trihydrate being present in a proportion of 90 to 110 parts by weight per 100 parts by weight of the polyorganosiloxanes.

12. A composition according to claim 9 wherein the inorganic extending or non-reinforcing filler is one or more materials selected from melamine, iron oxide, zinc oxide, titanium dioxide, zirconium oxide, zinc borate or chromic oxide.

13. A composition according to claim 12 wherein the inorganic extending or non-reinforcing filler is melamine.

14. A composition according to claim 1 consisting essentially of:
   a) about 46 weight percent of a hydroxyl terminated dimethyl polysiloxane fluid having a viscosity of 1,000 to 5,000 Centipoise at 25° C.;
   b) about 4 weight percent of a mixture of amorphous and crystalline $SiO_2$ fillers having a specific gravity of 2.2 and surface area of up to about 130 m$^2$/g;
   c) about 6 weight percent of methyl tris-(methyl ethyl ketoxime)silane;
   d) about 1 weight percent of N-(2 aminoethyl-3 aminopropyl)trimethoxysilane;
   e) about 0.1 weight percent of dibutyltindilaurate;
   f) about 40 weight percent of alumina trihydrate; and
   g) about 3 weight percent of a gray pigment.

15. A method of providing a surface with a high gloss coating comprising
   (1) applying to the surface a thin layer of a one-part organopolysiloxane rubber composition consisting essentially of the product which is obtained by mixing the following:
   a) from about 20 to about 60 weight percent of one or more polydiorganosiloxane fluids of the formula $HO[(R)_2SiO]_n(R)_2SiOH$ in which R is a monovalent alkyl or alkenyl radical having 1 to 8 carbon atoms or a phenyl radical, and n has an average value such that the viscosity is from about 100 to about 20,000 centipoise at 25° C.;
   b) from 0 to about 8 weight percent of a bifunctional chain extender of the general formula $R^4{}_2\text{—Si—}X_2$ where X is alkoxy or ketoximino and R4 is a monovalent alkyl or alkenyl radical having 1 to 8 carbon atoms or a phenyl radical;

c) from 0 to about 50 weight percent of an inorganic extending or non-reinforcing filler;
   d) from about 0.5 to about 20 weight percent of an amorphous $SiO_2$ reinforcing filler having a surface area of between about 50 to 250 m$^2$/g and a particle size range between about 0.01 and 0.03 microns;
   e) from about 3 to about 15 weight percent of one or more crosslinking agents of general formula $(X)_{4-m}\text{—Si—}R'_m$ where R' is an alkyl, alkenyl or phenyl radical, X is an alkyl radical with a functional group selected from carboxyl, ketoximino, alkoxy, carbonyl or amine linked directly to the silicone atom, and m is an integer of from 0 to 2;
   f) from about 0.2 to about 3 weight percent of an adhesion promoter of the formula $(R^2O)_{3-b}SiR^1{\overset{R^3{}_b}{|}}$ in which $R^2$ and $R^3$ are independently selected from a monovalent alkyl or alkenyl radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group; and
   g) from about 0.02 to about 3 weight percent of an organotin salt as a condensation catalyst; and
   (2) allowing the layer of the one-part organopolysiloxane rubber composition to cure at room temperature to a silicone elastomer.

16. A method according to claim 15 wherein n is selected such that the viscosity is from about 1,000 to about 5,000 centipoise at 25° C.

17. A method according to claim 16 wherein R is alkyl.

18. A method according to claim 17 wherein the inorganic extending or non-reinforcing filler is one or more materials selected from calcium carbonate, barium sulfate, iron oxide, diatomaceous earth, melamine, quartz, crystalline silica, titanium dioxide, zinc oxide, zirconium oxide, zinc borate and chromic oxide.

19. A method according to claim 15 wherein the composition consists essentially of:
   a) about 46 weight percent of a hydroxyl terminated dimethyl polysiloxane fluid having a viscosity of 1,000 to 5,000 Centipoise at 25° C.;
   b) about 4 weight percent of a mixture of amorphous and crystalline $SiO_2$ fillers having a specific gravity of 2.2 and surface area of up to about 130 m$^2$/g;
   c) about 6 weight percent of methyl tris-(methyl ethyl ketoxime)silane;
   d) about 1 weight percent of N-(2 aminoethyl-3 aminopropyl)trimethoxysilane;
   e) about 0.1 weight percent of dibutyltindilaurate;
   f) about 40 weight percent of alumina trihydrate; and
   g) about 3 weight percent of a gray pigment.

* * * * *